(12) United States Patent
Hori et al.

(10) Patent No.: US 7,801,134 B2
(45) Date of Patent: Sep. 21, 2010

(54) VOIP SYSTEM, VOIP SERVER AND CLIENT, AND MULTICAST PACKET COMMUNICATION METHOD

(75) Inventors: Masato Hori, Kanagawa (JP); Yoshikazu Kobayashi, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 1868 days.

(21) Appl. No.: 10/864,519

(22) Filed: Jun. 10, 2004

(65) Prior Publication Data

US 2004/0252691 A1 Dec. 16, 2004

(30) Foreign Application Priority Data

Jun. 11, 2003 (JP) .............................. 2003-166764

(51) Int. Cl.
*H04L 12/28* (2006.01)

(52) U.S. Cl. ................... 370/390; 370/352; 370/392; 370/404; 709/204; 709/220; 709/224; 709/227; 709/245; 725/93

(58) Field of Classification Search ............ 370/395.52, 370/270, 261, 230.1, 260, 352, 390, 392, 370/395.42, 401, 404; 709/204, 228, 220, 709/224, 226, 227, 245; 725/93
See application file for complete search history.

(56) References Cited

U.S. PATENT DOCUMENTS

| | | | | |
|---|---|---|---|---|
| 5,600,644 A | * | 2/1997 | Chang et al. ................. | 370/404 |
| 5,694,547 A | * | 12/1997 | Subramanian et al. ...... | 709/224 |
| 5,758,070 A | * | 5/1998 | Lawrence .................... | 709/220 |
| 5,784,561 A | * | 7/1998 | Bruno et al. .................. | 709/204 |
| 5,790,804 A | * | 8/1998 | Osborne ....................... | 709/245 |
| 5,832,229 A | * | 11/1998 | Tomoda et al. .............. | 709/227 |
| 5,835,723 A | * | 11/1998 | Andrews et al. ............ | 709/226 |
| 6,138,144 A | * | 10/2000 | DeSimone et al. .......... | 709/204 |
| 6,141,341 A | * | 10/2000 | Jones et al. .................. | 370/352 |
| 6,181,697 B1 | * | 1/2001 | Nurenberg et al. .......... | 370/390 |
| 6,189,039 B1 | | 2/2001 | Harvey et al. | |
| 6,259,701 B1 | * | 7/2001 | Shur et al. ................... | 370/401 |
| 6,337,858 B1 | * | 1/2002 | Petty et al. .................. | 370/356 |
| 6,404,745 B1 | | 6/2002 | O'Neil et al. | |
| 6,477,169 B1 | * | 11/2002 | Angle et al. ........... | 370/395.42 |
| 6,501,739 B1 | * | 12/2002 | Cohen ......................... | 370/260 |
| 6,567,851 B1 | * | 5/2003 | Kobayashi ................... | 709/228 |

(Continued)

FOREIGN PATENT DOCUMENTS

EP 0 902 569 A1 3/1999

(Continued)

*Primary Examiner*—Gerald Gauthier
(74) *Attorney, Agent, or Firm*—Sughrue Mion, PLLC

(57) ABSTRACT

A VoIP system has a VoIP server and plural clients. The client transmits paging data as multicast packets addressed at a specific multicast address, to other clients. In response to a request from the client, the VoIP server transmits multicast packets of MOH data to the other clients. At this time, whether the other clients can receive multicast packets is determined. To the clients that are determined to be capable of receiving multicast packets, transmission data is sent in the form of multicast packets. To the client which belongs to a router and is determined to be incapable of receiving multicast packets, the transmission data is sent as unicast packets. It is thus possible for the VoIP system to support paging and MOH in the form of multicast packets, with respect to clients incapable of receiving multicast.

14 Claims, 16 Drawing Sheets

U.S. PATENT DOCUMENTS

| | | |
|---|---|---|
| 6,614,781 B1 * | 9/2003 | Elliott et al. ............... 370/352 |
| 6,735,193 B1 * | 5/2004 | Bauer et al. ............... 370/352 |
| 7,079,495 B1 * | 7/2006 | Pearce et al. ............... 370/260 |
| 7,173,911 B1 * | 2/2007 | Sarkar et al. ............... 370/252 |
| 7,415,005 B1 * | 8/2008 | Macha et al. ............... 370/352 |
| 7,443,851 B2 * | 10/2008 | Fukushima et al. ......... 370/390 |
| 2002/0035730 A1 * | 3/2002 | Ollikainen et al. ............ 725/93 |
| 2002/0067724 A1 * | 6/2002 | Helm et al. ............... 370/390 |
| 2002/0114302 A1 * | 8/2002 | McDonald et al. .......... 370/338 |
| 2003/0002481 A1 * | 1/2003 | Laursen et al. .............. 370/352 |
| 2003/0099198 A1 * | 5/2003 | Kiremidjian et al. ...... 370/230.1 |
| 2003/0206546 A1 * | 11/2003 | Beyda ...................... 370/352 |
| 2004/0223464 A1 * | 11/2004 | Dye et al. .................. 370/260 |

FOREIGN PATENT DOCUMENTS

| | | |
|---|---|---|
| EP | 1 091 548 A2 | 4/2001 |
| EP | 1 244 282 A2 | 9/2002 |
| JP | 04-192955 | 7/1992 |
| JP | 11-177628 | 7/1999 |
| JP | 2000-059471 A | 2/2000 |
| JP | 2001-156941 | 6/2001 |
| JP | 2001-230774 | 8/2001 |
| JP | 2001-237888 | 8/2001 |
| JP | 2002-118552 A | 4/2002 |
| JP | 2002-209025 A | 7/2002 |
| JP | 2002-290549 A | 10/2002 |
| JP | 2002-314683 A | 10/2002 |
| JP | 2003-110660 A | 4/2003 |
| JP | 2003-134117 A | 5/2003 |
| JP | 2003-134253 A | 5/2003 |
| JP | 2004-320290 A | 11/2004 |

* cited by examiner

PROCESSINGS IN CLIENT'S SIDE

PROCESSINGS IN CLIENT'S SIDE

PROCESSINGS IN CLIENT'S SIDE

PROCESSINGS IN CLIENT'S SIDE

VOIP SYSTEM, VOIP SERVER AND CLIENT, AND MULTICAST PACKET COMMUNICATION METHOD

BACKGROUND OF THE INVENTION

1. Field of the Invention

The present invention relates to a VoIP (Voice on Internet Protocol) system, VoIP server and client, and a multicast packet communication method, and more particularly, to a VoIP system which transmits data such as paging data broadcasted concurrently and MOH (Music On Hold) data, in the form of multicast packets.

2. Description of the Related Art

There has been a known VoIP system which enables voice communications with use of an IP (Internet Protocol) network used for the Internet. For example, a VoIP system is constructed by connecting a VoIP server and plural clients to each other on an IP network. Under control from the VoIP server, voice communications are realized between the plural clients, using, as media, voice data decomposed into IP packets.

The prior art document relating to the VoIP system includes the following: JP-A-2001-230774 and JP-A-H04(1992)-192955.

In the conventional VoIP system described above, problems described below are expected in case of transmitting, as multicast packets, paging data broadcasted concurrently on the IP network and MOH data which notifies holding status upon a hold operation during voice communication.

For example, in case of paging, a client who executes paging transmits transmission data for the paging as multicast packets to all clients equally, regardless of whether the client who receives the paging can receive multicast packets or not. Alternatively, the client transmits paging data as unicast packets to every client that is a target receiver of the paging.

Also in case of MOH, a VoIP server transmits voice packets for the MOH, in the form of multicast packets, regardless of whether the receiver who receives MOH data is capable of receiving multicast packets or not. Alternatively, an internal sound source is provided in every client to let users hear MOH.

Therefore, there are clients in a network environment in which the clients cannot receive multicast packets due to any reason, such as clients connected to a router incapable of routing multicast packets. Those clients cannot receive transmission data of paging or MOH transmitted in the form of multicast packets from other clients or a VoIP server.

The foregoing problems in multicast packet communications in the VoIP system are not limited to the paging or MOH but are common to communications among three or more partners (e.g., telephone-communication conferences [conference call]), streaming, etc.

SUMMARY OF THE INVENTION

An object of the present invention is to provide a VoIP system capable of supporting clients who cannot receive multicast packets so that the clients can receive transmitted data in case where transmission data of paging or MOH is transmitted as multicast packets through a VoIP system.

To achieve the above object, the present invention has a feature of automatically determining those clients that cannot receive multicast packets, and of transmitting data in the form of unicast packets or using internal sound sources of the clients, as a different receiving method from a multicast method, to support paging and MOH for those clients.

The present invention has been accomplished based on this conception.

According to an aspect of the present invention, a VoIP system comprises a VoIP server connected to an IP network, and plural clients connected communicably to the VoIP server via the IP network, wherein voice communication is enabled via the IP network between a source client among the plural clients, which transmits IP packets, and a destination client among the plural clients, which receives the IP packets, the plural clients each have a first multicast transmission unit which transmits predetermined transmission data, as multicast packets addressed at a specific multicast address, to plural destination clients, and a multicast transmission request unit which sends a predetermined request message to the VoIP server, requesting the VoIP server to transmit the multicast packets, and the VoIP server has a second multicast transmission unit which transmits the multicast packets to the plural destination clients upon receipt of the request message sent from the client by the multicast transmission request unit.

The VoIP server may further comprise: a determination unit which determines whether the plural destination clients are capable of receiving the multicast packets when the multicast packets are transmitted by the first or second multicast transmission unit; and a transmission control unit which controls the first or second multicast transmission unit to transmit the transmission data as unicast packets to those destination clients that are determined to be incapable of receiving the multicast packets, based on a determination result.

The determination unit may transmit a predetermined test message as multicast packets to the plural destination clients and may determine whether the plural destination clients can receive the multicast packets or not.

The transmission control unit may have a table in which determination results obtained by the determination unit are registered, and a unit which makes the transmission control unit operate based on the determination results registered in the table, without using the determination unit.

The transmission data may be data broadcasted concurrently by paging.

The transmission data may be music-on-hold data to be sent in accordance with a hold operation at the time of the voice communication.

The VoIP server may further have a unit which sends a request for reproducing the internal sound source, to the destination clients, if the destination clients each have an internal sound source of the music-on-hold data, and the clients each may further have a unit which reproduces the internal sound source upon receipt of the reproduction request.

According to another aspect of the present invention, a VoIP server for use in a VoIP system in which voice communication is enabled via the IP network between a source client among plural clients, which transmits IP packets, and a destination client among the plural clients, which receives the IP packets, may comprise: a multicast transmission unit which transmits predetermined data as multicast packets to plural destination clients upon receipt of a request message requesting transmission of multicast packets and sent from the source client; a determination unit which determines whether the plural destination clients are capable of receiving the multicast packets when the multicast packets are transmitted by the multicast transmission unit or the source client; and a transmission control unit which controls the multicast transmission unit or the source client to transmit the transmission data as unicast packets to those destination clients that are determined to be incapable of receiving the multicast packets, based on a determination result.

According to further another aspect of the present invention, a client connected communicably to a VoIP server via an IP network, comprises: a unit which transmits predetermined transmission data, as multicast packets addressed at a specific multicast address, to plural destination clients; and a unit which transmits a predetermined request message requesting the VoIP server to transmit the multicast packets, to the VoIP server.

Also according to further another aspect of the present invention, a multicast packet communication method for a VoIP system comprises a VoIP server connected to an IP network, and plural clients connected communicably to the VoIP server via the IP network, enabling voice communication via the IP network between a source client among the plural clients, which transmits IP packets, and a destination client among the plural clients, which receives the IP packets. The method comprises: a step in which the plural clients transmit predetermined transmission data, as multicast packets addressed at a specific multicast address, to plural destination clients; a step in which a predetermined request message is sent from any of the plural clients to the VoIP server, to request the VoIP server to transmit the multicast packets; a step in which upon receipt of the request message sent from any of the clients, the VoIP server transmits the multicast packets to the plural destination clients; a step in which when the multicast packets are transmitted by the VoIP server or any of the clients, whether the plural destination clients can receive the multicast packets or not is determined; and a step in which the VoIP server performs control to transmit the transmission data as unicast packets to those of the destination clients that are determined to be incapable of receiving the multicast packets, based on the determination results.

DETAILED DESCRIPTION OF THE PREFERRED EMBODIMENTS

Preferred embodiments of a VoIP system, VoIP server and client, and a multicast packet communication method according to the present invention will be described below with reference to the accompanying drawings.

First Embodiment

Figure 1:
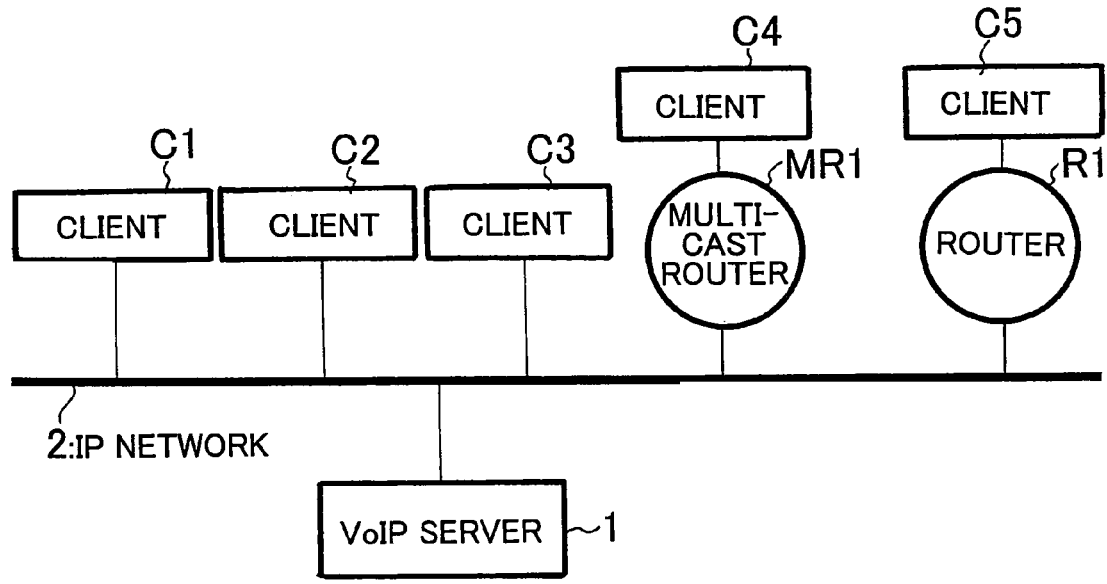
FIG. 1 is a schematic block diagram showing an example of the entire structure of a VoIP system according to an embodiment of the present invention.

FIG. 1 shows the entire configuration of a VoIP system according to an embodiment of the present invention.

As shown in FIG. 1, the VoIP system is constructed on an IP network 2, and includes a VoIP server 1, plural clients C1 to C5 connected communicably to the VoIP server 1, a router MR1 compatible with multicasting (hereinafter referred to as a "multicast router"), and a router R1 incompatible with multicasting. Under control from the VoIP server 1, voice communications are possible among the clients C1 to C5 via the IP network 2.

Three clients C1 to C3 among the clients C1 to C5 are connected to the same subnet forming part of the IP network 2 as the VoIP server 1. The client C4 is connected to another subnet which also forms part of the IP network 2 and belongs to the multicast router MR1. The client C5 is connected to further another subnet which forms part of the IP network 2 and belongs to the router R1 that is not compatible with multicasting.

Figure 2:
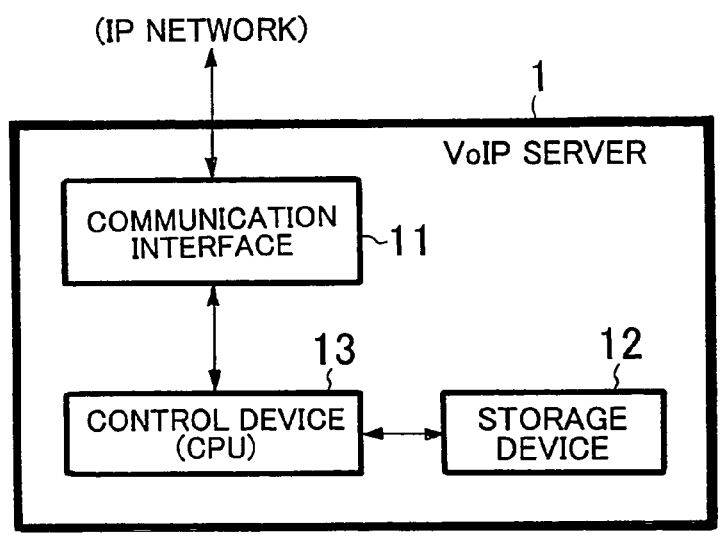
FIG. 2 is a schematic block diagram showing the internal structure of a VoIP server.
Figure 3:
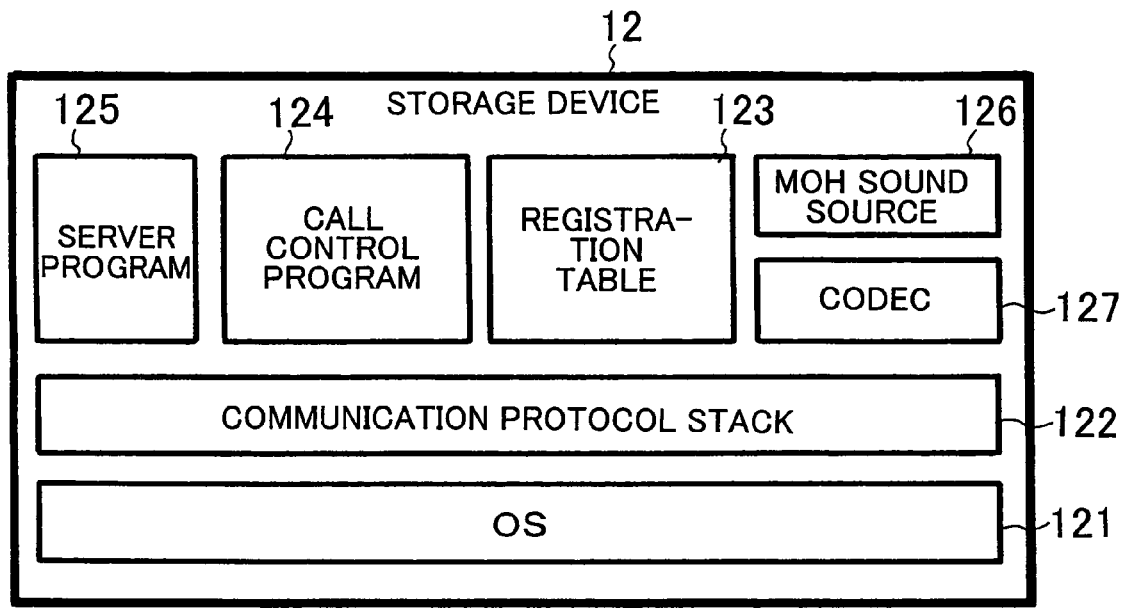
FIG. 3 is a schematic diagram showing the software configuration, stored in a storage device of the VoIP server.

FIGS. 2 and 3 show an example of the configuration of the VoIP server 1.

The VoIP server 1 is composed of a server computer such as an SIP server, H.323 server, or the like. As shown in FIG. 2, in its hardware configuration, the server 1 includes, for example, a communication interface 11 connected to the IP network 2, an OS (Operating System), a storage device 12 for holding programs to serve as a VoIP server, and a control device (CPU) 14 which executes a call control program in the storage device 13 to control the entire operations.

As shown in FIG. 3, the storage device 12 among these components includes; for example, an OS 121; a communication protocol stack 122 which controls data communication based on IP packets; a database (registration table) 123 which registers status and information concerning clients; control programs, for example, call control protocols 124 such as H.323, SIP (Session Initiation Protocol), MEGACO (Media Gateway Control Protocol) (H.248), or the like which defines voice communication procedures (making and receiving calls), and a server program 125 which defines processing procedures for the multicast packet communication method; an MOH sound source 126; and a CODEC 127 which encodes data of the MOH sound source 126 into audio data to be sent through the communication interface 11.

The VoIP server 1 has a function to register the clients C1 to C5 and to perform call control of each client, and a function to send MOH data by multicasting or unicasting. In addition, the sever 1 has a function to test clients as receivers for ability to receive multicast packets, when any client is going to send multicast packets, and to send a message suggesting transmission based on unicasting (or an internal sound source in case of MOH) to those clients that cannot receive multicast packets, due to the above configurations described above and the program controls thereof.

If a registration request is issued from any of the clients C1 to C5, the VoIP server 1 receives the registration request, performs a call processing thereof, and sends MOH by multicasting or unicasting, due to the functions described above. Alternatively, if any client requests paging or holding, the VoIP server 1 sends multicast packets to determine whether the receiver thereof can receive multicast packets.

Figure 4:
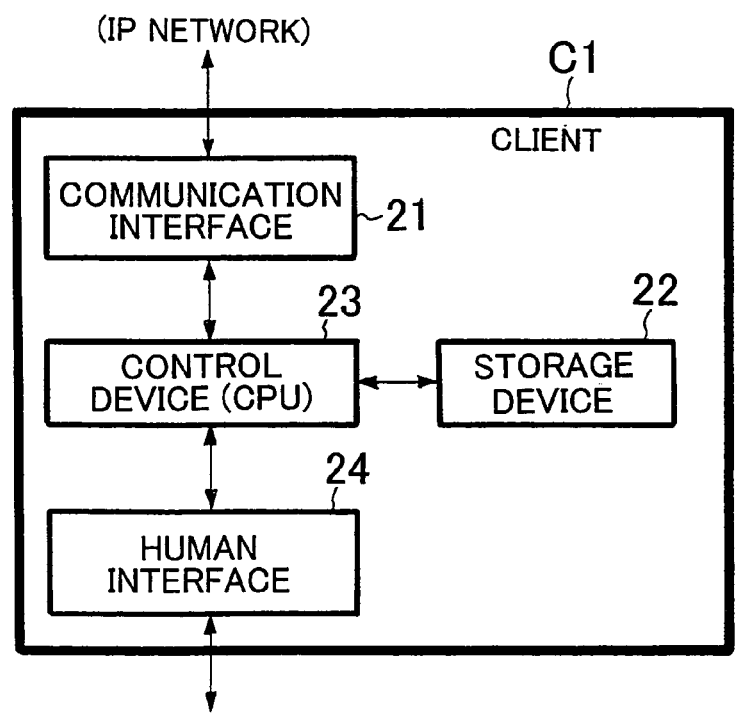
FIG. 4 is a schematic block diagram showing the internal structure of a client.
Figure 5:
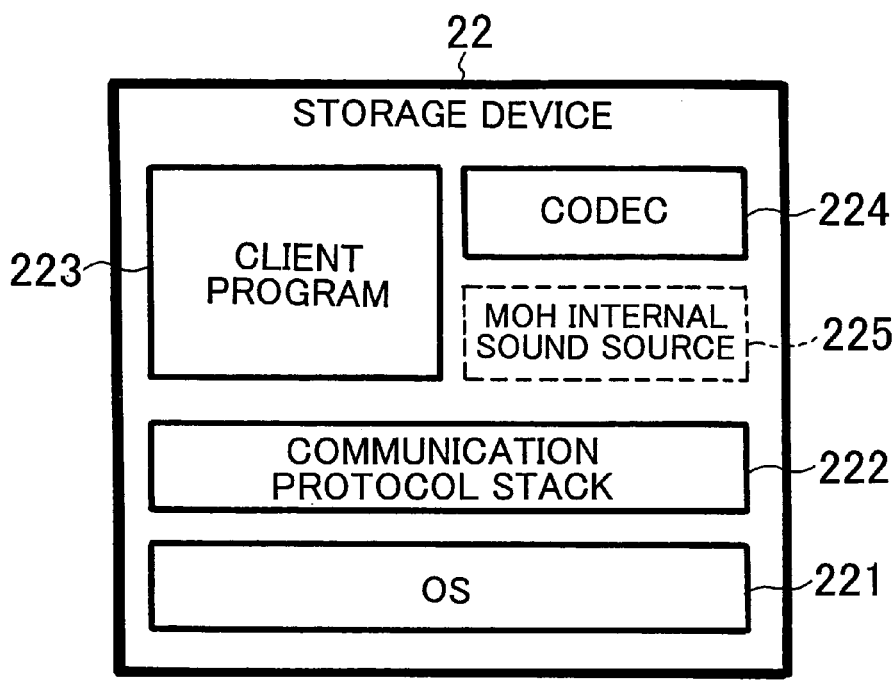
FIG. 5 is a schematic diagram showing the software structure, stored in a storage device of the client.
Figure 6:
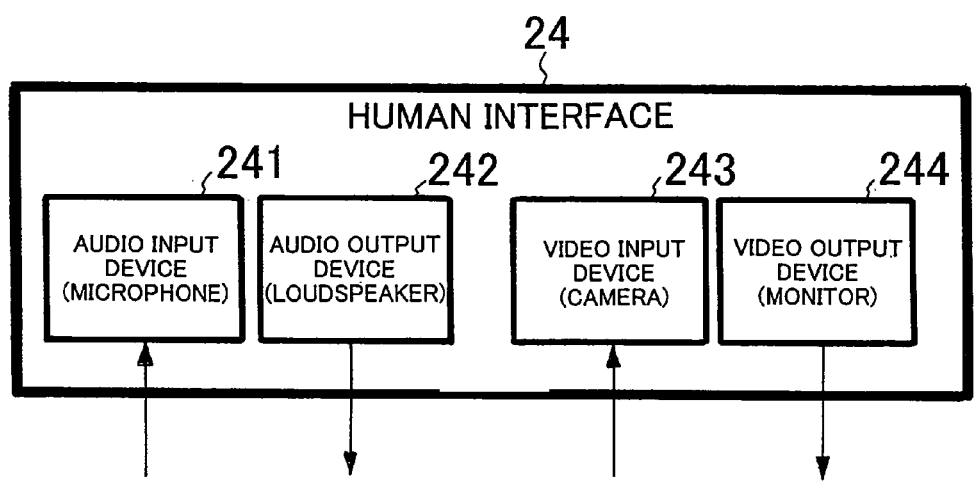
FIG. 6 is a schematic diagram showing the structure of an human interface of the client.

FIGS. 4 to 6 shows a configuration example of the client C1. The other clients C2 to C5 each have the same configuration as the client C1.

The client C1 is composed of, for example, a client computer such as a general-purpose PC (Personal Computer), PDA (Personal Digital Assistant), a dedicated IP phone, or the like. As shown in FIG. 5, in its hardware configuration, the client C1 includes: a communication interface 21 connected to the IP network 2; a storage device 22 which stores control programs such as a client program or the like to control voice communication and transmission/reception of audio/video in accordance with commands from the OS or VoIP server 1 and user's operations, and control data; a control device (CPU) 23 which executes the client program in the storage device 22 and controls the entire operations; and a human interface 24 to input/output audio/video.

As shown in FIG. 5, the storage device 22 among these components includes: an OS 221; a communication protocol stack 222 which controls data communication based on IP packets; a control program such as a client program 223 which defines processing procedures in the client's side, according to the multicast packet communication method of the present invention; and a CODEC 224 having a function to convert (encode) data inputted from the human interface 24 and convert (decode) audio/video data received from the communication interface 21 into data reproducible by the client C1. In some cases, the storage device 22 may have an MOH internal sound source 225 to locally generate MOH.

As shown in FIG. 6, the human interface 24 has input/output devices including an audio input device 241 such as a microphone, an audio output device 242 such as a loudspeaker, a video input device 243 such as a camera, a video output device 244 such as a monitor, etc. A USB (Universal Serial Bus)-type handset or a microphone and a loudspeaker which are built in a PC can be applicable as those input/output devices.

Among these components, the VoIP server 1 and the three clients C1 to C3 connected to the same subnet as that of the server 1 have functions to perform client registration in the VoIP server 1 via the subnet and to directly receive multicast packets from each client or the VoIP server 1, due to the configurations described above and the program controls thereof.

The client C4 has functions to perform client registration in the VoIP server 1 via the multicast router MR1, make communication according to IGMP (Internet Group Management Protocol) with the multicast router MR1, and receive multicast packets from the clients C1 to C3 or the VoIP server 1 by participating in a specific multicast group. The IGMP used herein is a protocol to control participating in or leaving a multicast group defined according to RFC1112, RFC2236 (IGMPV2), or RFC3376 (IGMP V3), due to the above configuration and the program control.

For example, when the VoIP server 1 distributes MOH to a specific multicast address, e.g., 239.255.1.1, the multicast router MR1 does not normally route those packets that are addressed to 239.255.1.1, to the subnet to which the client C4 belongs. When the client C4 intends to receive the MOH, it is necessary to notify the multicast router MR1 of the client's participation in the multicast group. The IGMP is a protocol used at this time. The multicast router MR1 periodically sends IGMP query according to the IGMP, in order to check whether any client among subordinate clients who belongs to the router MR1 participates in a specific multicast group or not. In this case, the client C4 replies an IGMP report to the MR1 in response to the IGMP query. In this way, the multicast router MR1 knows existence of any participant in the multicast group, among the subordinate clients of the multicast router MR1, and therefore routes the packets addressed to 239.255.1.1 to the subnet to which the client C4 belongs. The client C4 thus becomes able to receive MOH distributed from the VoIP server 1.

Further, the client C5 has a function to perform client registration in the VoIP server 1 via the router R1, due to the above configuration and program control described above. However, the client C5 cannot receive multicast packets from the clients C1 to C3 or the VoIP server 1 because the router R1 is not compatible with multicasting.

The multicast router MR1 has a known function to route IP packets, and further a function to route multicast packets to a client by executing communication according to the IGMP described above if the client (C4 in the example of FIG. 1) as a subordinate client of the router participates in a specific multicast group.

Although the router R1 has a known IP routing function, the router R1 does not have a function to route multicast packets beyond the IP network 2 where the VoIP server 1 is provided, i.e., beyond the subnet, unlike the multicast router MR1. This means that a client (C5 in the example of FIG. 1) as a subordinate client to the router R1 cannot receive multicast packets sent from the subnet where the VoIP server 1 exists through the router R1.

Next, the operations of the present embodiment will be described with reference to FIGS. 7 to 15.

Figure 7:
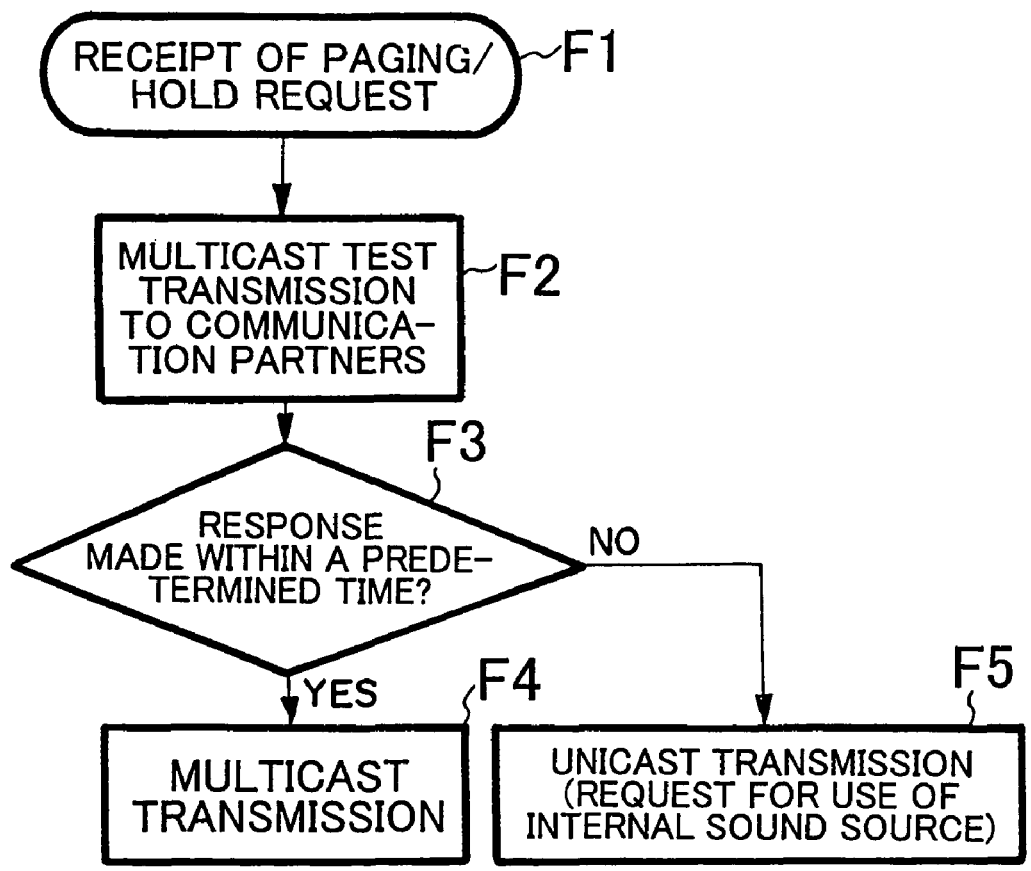
FIG. 7 is a schematic flowchart showing processing operations of the VoIP server.
Figure 8:
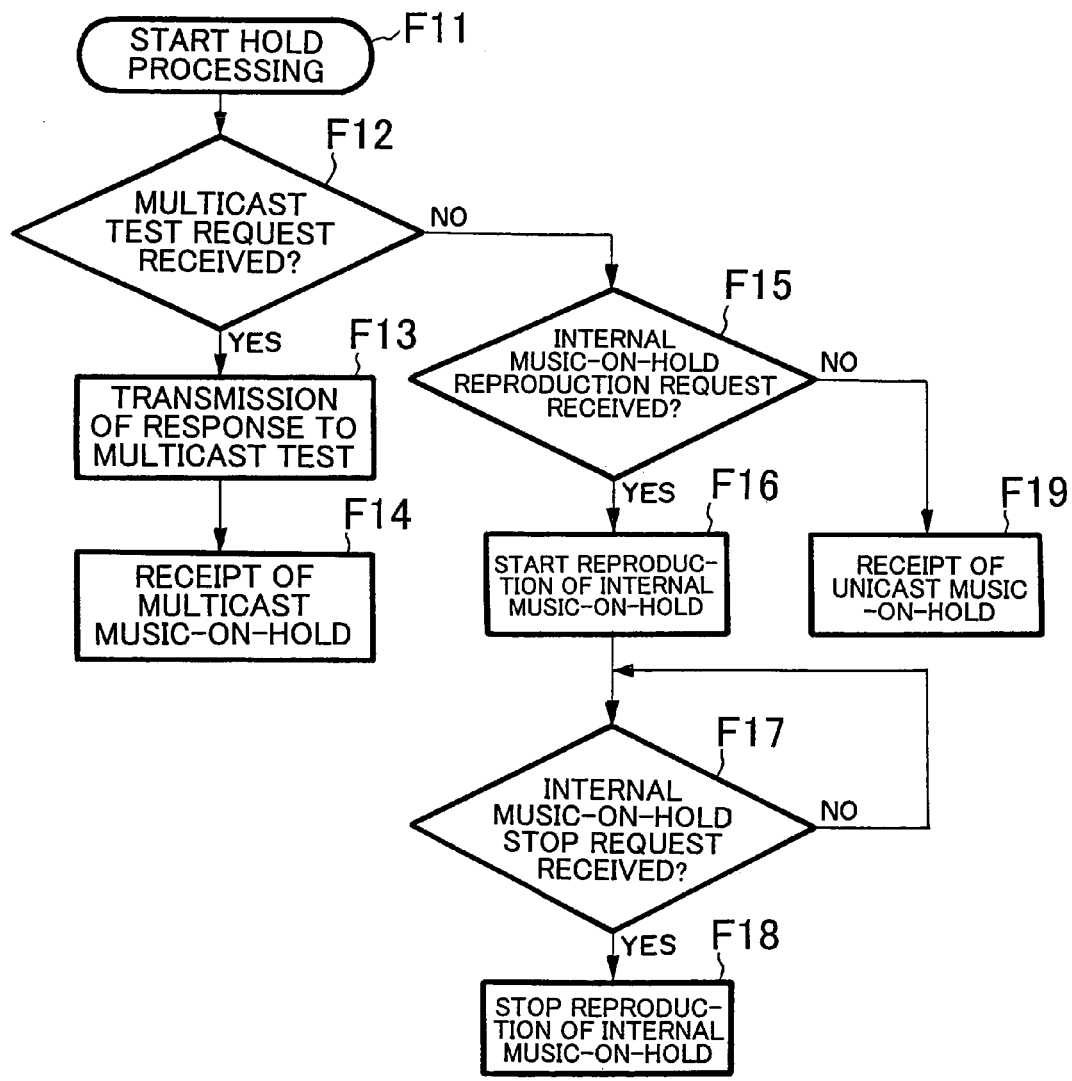
FIG. 8 is a schematic flowchart showing processing operations concerning MOH, in the client's side.
Figure 9:
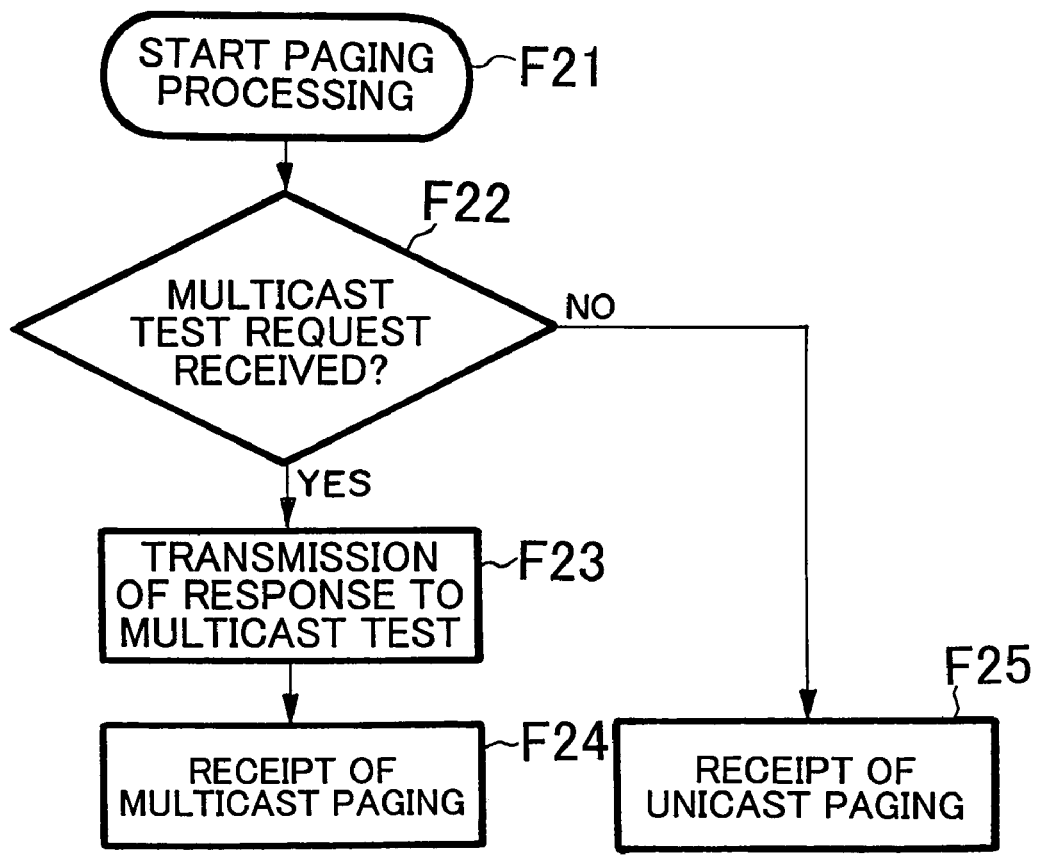
FIG. 9 is a schematic flowchart showing processing operations concerning paging, in the client's side.

The flowchart shown in FIG. 7 is executed under the program control from the VoIP server 1. The flowcharts shown in FIGS. 8 and 9 are executed under the program controls from the clients C1 to C5. The respective sequence charts shown in FIGS. 10 to 14 chronologically show the flows of various messages transmitted/received between the VoIP server 1 and the clients C1 to C5. FIG. 15 shows a format example of a typical message.

Suppose now that the clients C1 to C5 are registered in the VoIP server 1.

First, such a case will be described that MOH caused by a holding operation during voice communication is transmitted as multicast packets on the IP network 2.

Figure 10:
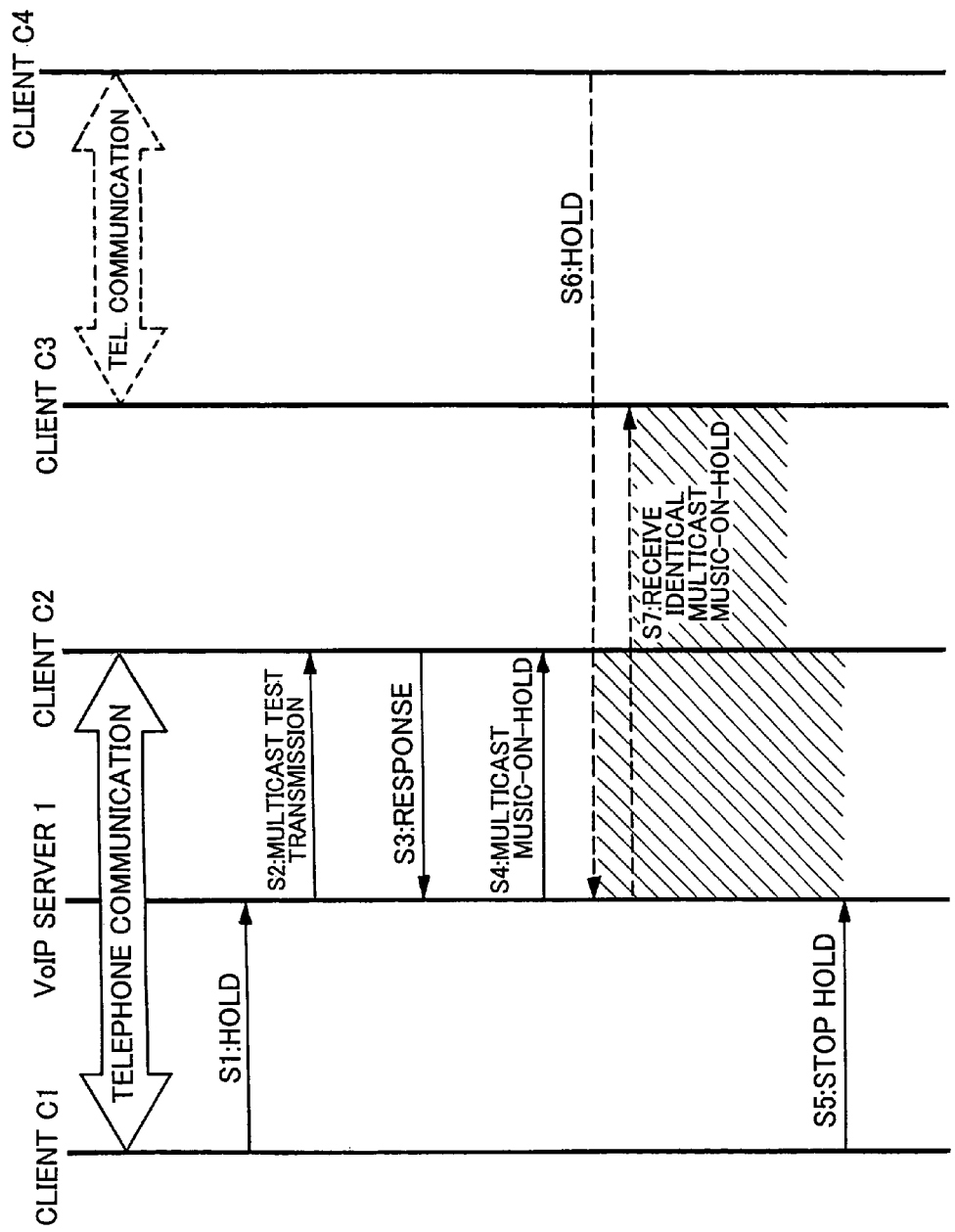
FIG. 10 is a sequence chart in case of transmitting MOH data as multicast packets.

As shown in FIG. 10, if the client C1 performs a holding operation while the clients C1 and C2 are telephone-communicating with each other, the client C1 transmits packets of a hold request message to the VoIP server 1 via the IP network 2 under the program control from the control device 23 (step S1 in FIG. 10).

The VoIP server 1 receives the packets of the hold request message (in step F1 in FIG. 7). In response thereto, the VoIP server 1 transmits packets of a test message, as packets (multicast packets) addressed at a multicast address, to all the clients that participate in a preset determination-test multicast group, in order to determine whether or not the client C2 as the communication partner of the client C1 can receive multicast packets (see step F2 in FIG. 7, step S2 in FIG. 10, and the multicast test request in FIG. 15).

The clients that participate in the determination-test multicast group correspond to all the clients registered in the VoIP server 1. That is, in the case of the present embodiment, all of the clients C1 to C5 participate in the group. The VoIP server 1 carries out processing, supposing that all the registered clients have received the message as the packets addressed at the multicast address. Note that in case of the client C4 as a subordinate client which belongs to the multicast router MR1 (which can be an IGMP querier), the setting for participating in the multicast group is carried out by IGMP query and an IGMP report. The other clients may merely receive the packets addressed at the multicast address.

FIG. 15 shows a format example of a typical message including the test message. Each message shown in FIG. 15 is composed of, in addition to the multicast address (not shown) described above, a "message ID" for uniformly identifying the type of the message, a "command ID" for identifying the contents of control, a "client ID" for identifying which client is subjected to the control or which client issues the control, and the like. Although the "client ID" is an IP address in this format example, this ID may be a client name as an alternative. In addition, practice of the present invention is not limited to the format shown in FIG. 15 but a message format according to a known call control protocol (e.g., MEGACO or the like) may be expanded originally. The multicast address may be set within a predetermined IP address range, for example, 239.255.1.1, etc.

The client C2 can receive the packets addressed at the determination-test multicast group, with respect to the test message (see the multicast test request in FIG. 15). Therefore, the client C2 transmits a response message (see the multicast test response in FIG. 15) thereto, to the VoIP server 1 (see step S3 shown in FIG. 10 and F11 to F13 in FIG. 8).

At this time, the VoIP server 1 waits for a response from the client C2 for a predetermined time and determines whether a response has arrived or not (step F3 in FIG. 7). In the present embodiment, the client C2 can receive multicast packets. Therefore, the VoIP server 1 receives a response thereto within the predetermined time, and then determines that the client C2 as a communication partner can receive multicast packets (YES in step F3 in FIG. 7). In accordance with this result, the VoIP server 1 encodes data of its own MOH sound source 126 by program control through the control device 13, and transmits the data as multicast packets to the client C2 via the IP network 2 (step F4 in FIG. 7 and step S4 in FIG. 10).

Upon receipt of the multicast packets of MOH through the communication interface 21 (step F14 in FIG. 8), the client C2 decodes the packets with use of the CODEC 224 under program control from the control device 23, and outputs the data as audio from the audio output device 242 of the human interface 24.

If the client C1 operates to stop holding while the MOH is being transmitted from the VoIP server 1, the client C1 transmits a hold-stop message to the VoIP server 1, and the VoIP server 1 thereby stops the transmission of the MOH to the client C2 (step S5 in FIG. 10).

As shown in FIG. 10, for example, while the MOH is being transmitted from the VoIP server 1, if the client C4 operates to hold among the other clients C3 and C4 which are in telephone-communicating status (step S6 in FIG. 10), the client C3 receives the MOH as the same multicast packets as those transmitted from the VoIP server 1 (step S7 in FIG. 10). When the transmission of the MOH is stopped (step S5 in FIG. 10), if the client C3 continues receiving the MOH, the VoIP server 1 does not stop but continues transmitting the MOH to the client C3.

Figure 11:
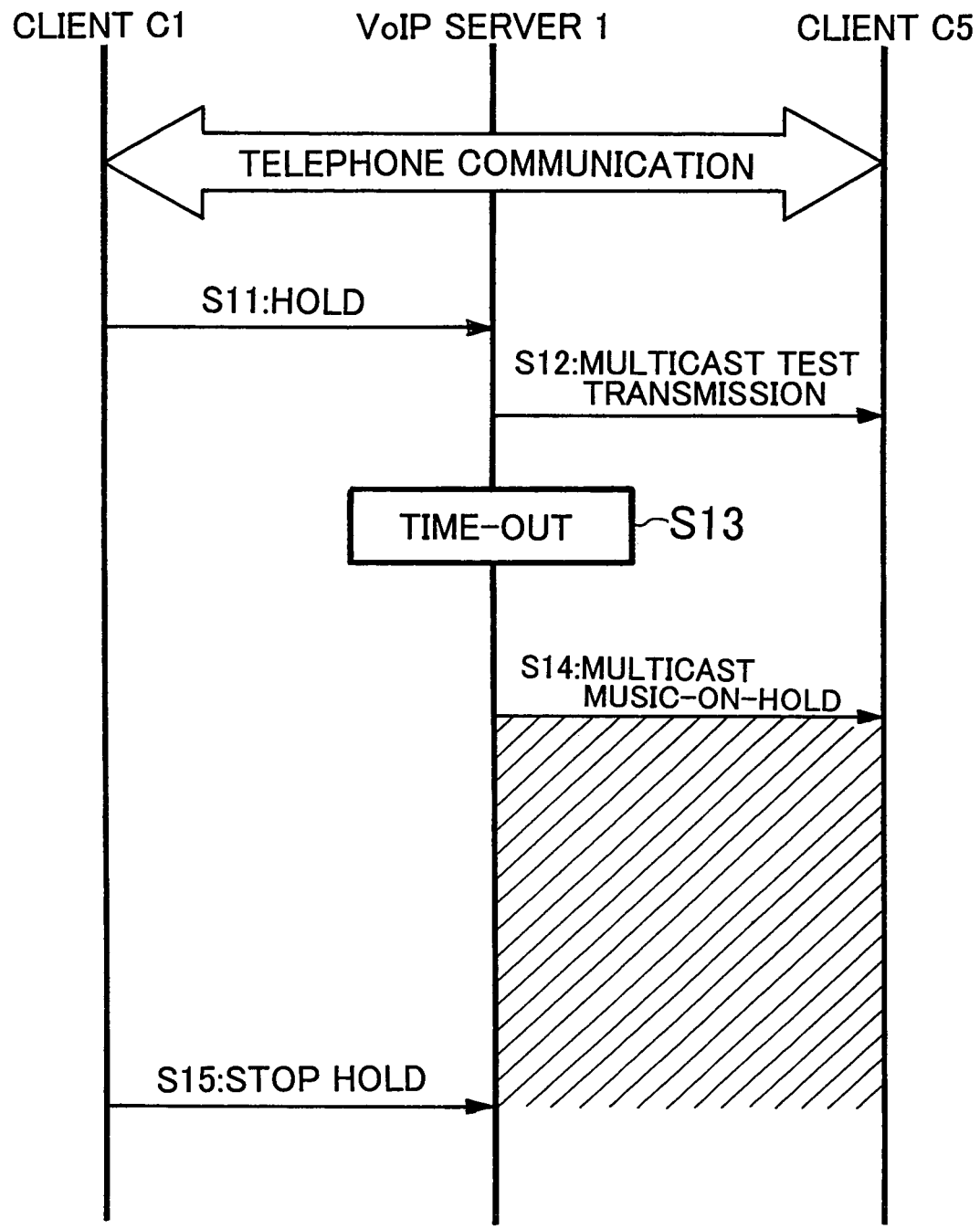
FIG. 11 is a sequence chart in case of transmitting MOH data as unicast packets.

In contrast to the above, when the clients C1 and C5 are in telephone-communicating status as shown in FIG. 11, if the client C1 operates to hold, the client C1 transmits a hold request message to the VoIP server 1 via the IP network 2, like the foregoing case (step S11 in FIG. 11).

Upon receipt of the hold request message (step F1 in FIG. 7), the VoIP server 1 transits the test message as multicast packets to the client C5 as a communication partner (step F2 in FIG. 2 and step S12 in FIG. 11).

Since the client C5 exists on the subnet which belongs to the router R1, unlike the client C2, the client C5 cannot receive multicast packets via the router R1 (NO in step F12 in FIG. 8).

Therefore, the VoIP server 1 cannot receive a response to the test message from the client C5 within a predetermined time. Due to time-out, the server 1 determines the client C5 to be incapable of receiving multicast packets (step S13 in FIG. 11). As a result, the VoIP server 1 transmits data of MOH, not as multicast packets but as unicast packets, to the client C5 via the IP network 2 through the communication interface 11 under program control from the control device 13 (step F5 in FIG. 7 and step S14 in FIG. 11).

Upon receipt of the unicast packets of MOH through the communication interface 21 (step F19 in FIG. 8), the client C5 decodes the packets with use of the CODEC 224 under program control from the control device 23, and outputs audio from the audio output device 242 of the human interface 24.

Thereafter, if the client C1 operates to stop holding while the VoIP server 1 is transmitting the MOH, the client C1 transmits a hold-stop message to the VoIP server 1, and then the VoIP server 1 stops transmitting the MOH to the client C2 (step S15 in FIG. 11).

The example shown in FIG. 11 assumes that the client C5 does not have the MOH sound source 225 as its internal sound source (NO in step F15 in FIG. 8).

Figure 12:
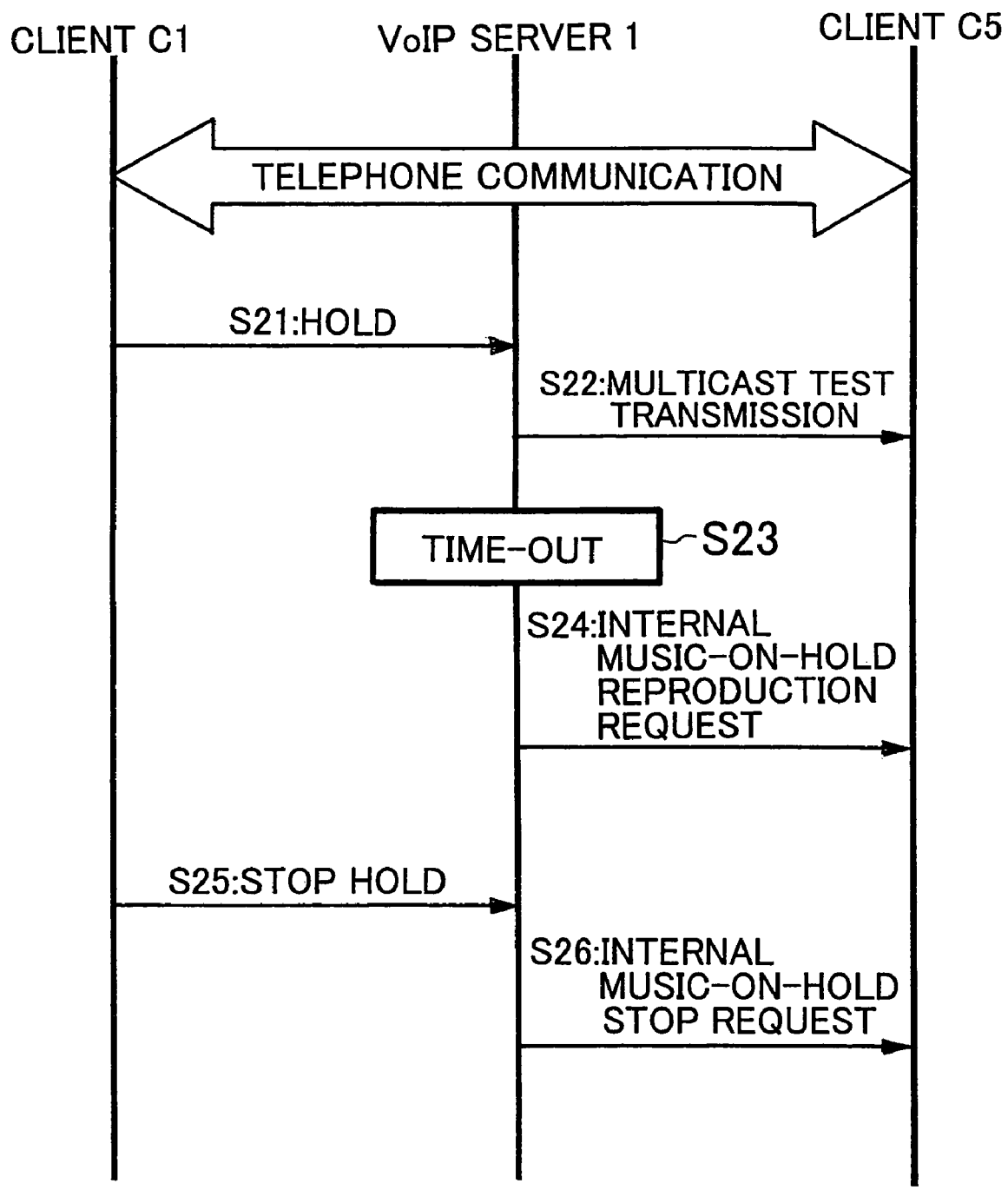
FIG. 12 is a sequence chart in case of sending an internal music-on-hold reproduction request in place of MOH data.

Otherwise, as shown in FIG. 12, if the client C5 has an internal music-on-hold source, a hold request message is transmitted in accordance with a hold operation of the client C1 like the foregoing case (step S21 in FIG. 12). In response, the VoIP server 1 transmits multicast packets of a test message (step S22 in FIG. 12). If there is no response from the client 5 within a predetermined time, the VoIP server 1 determines the client C5 to be incapable of receiving multicast packets due to the time-out (step S23 in FIG. 12). Thereafter, the VoIP server 1 transmits an internal music-on-hold source reproduction request (see the internal music-on-hold source request in FIG. 15) to the client C5, in place of the transmission of MOH by the above unicasting (step S24 in FIG. 12).

Upon receipt of the internal music-on-hold reproduction request (YES in step F15 in FIG. 8), the client C5 reproduces data of its own MOH sound source 225 as an internal sound source through the audio output device 242 of the human interface 24 (step F16 in FIG. 8), under program control from the control device 23.

Thereafter, when the client C1 stops holding (step S25 in FIG. 12), the VoIP server 1 transmits an internal music-on-hold stop request (see the internal music-on-hold request in FIG. 15) to the client C5 (step S26 in FIG. 12).

Upon receipt of the internal music-on-hold stop requent (YES in step F17 in FIG. 8), the client C5 stops reproducing the internal music-on-hold under program control from the control device 23 (step F18 in FIG. 8).

Next, such a case will be described that paging data broadcasted concurrently on the IP network 2 is transmitted as multicast packets.

Figure 13:
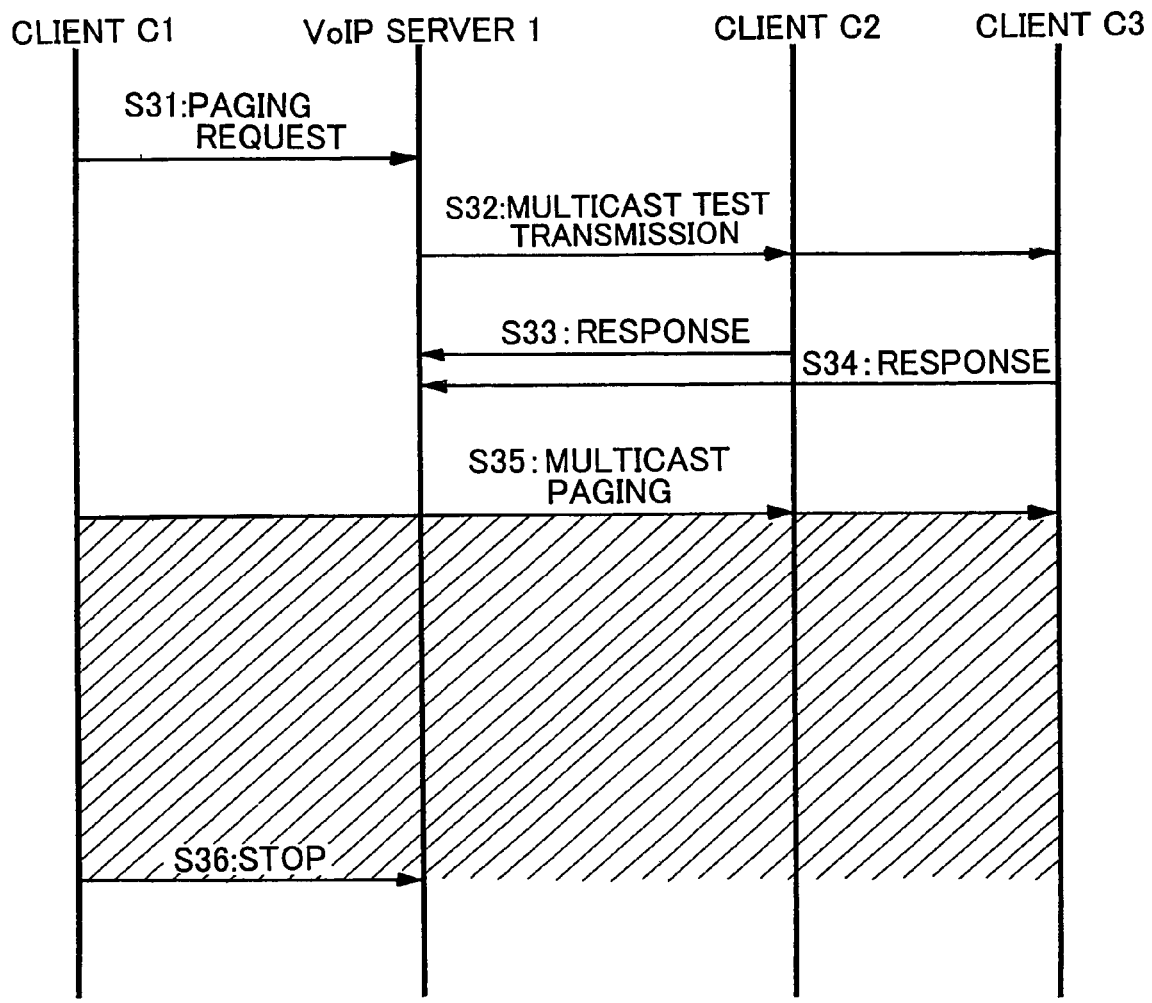
FIG. 13 is a sequence chart in case of transmitting paging data as multicast packets.
Figure 14:
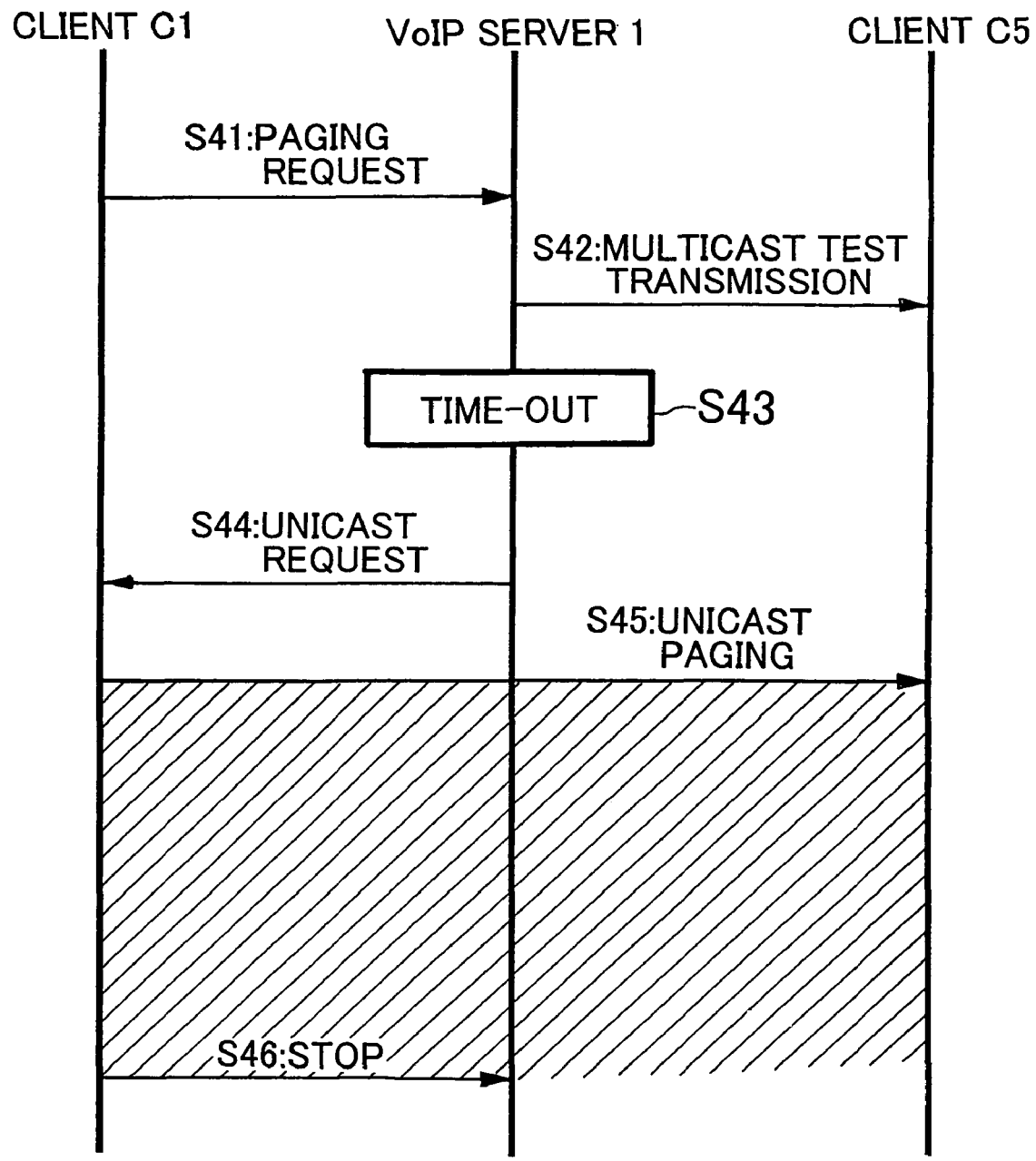
FIG. 14 is a sequence chart in case of transmitting paging data as unicast packets.
Figure 15:
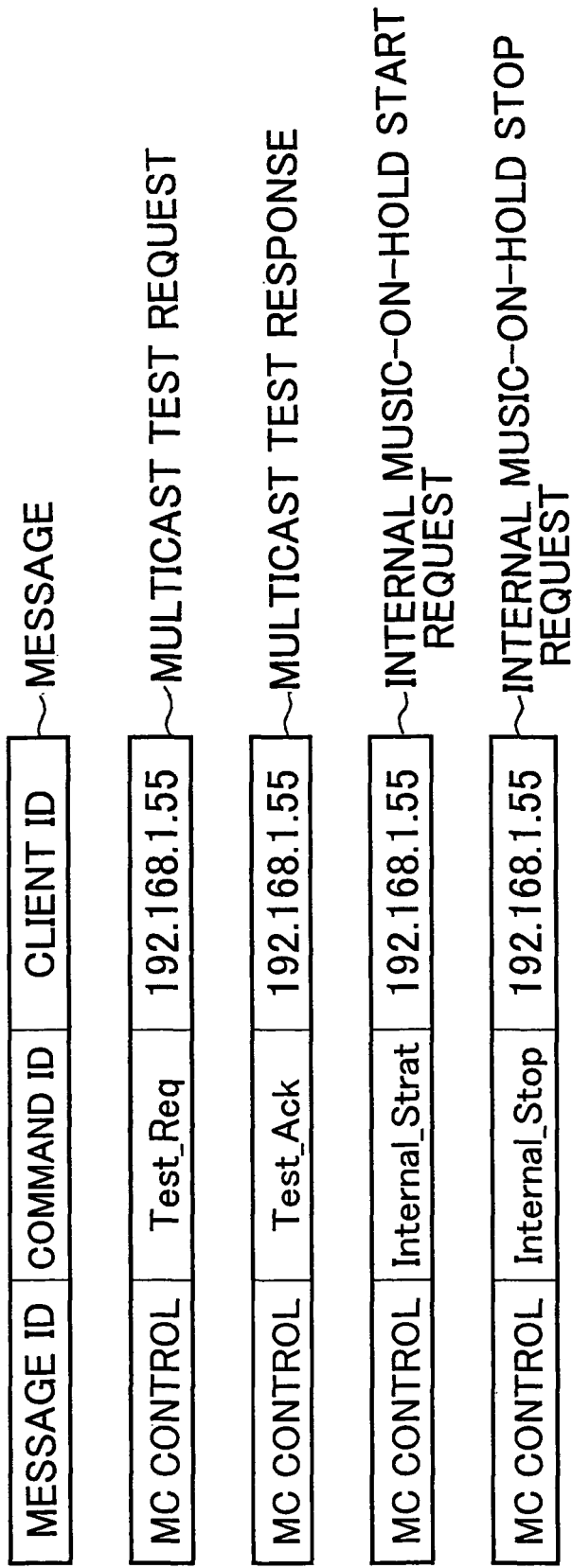
FIG. 15 explains format examples of messages.

At first, as shown in FIGS. 13 and 14, if the client C1 makes a paging operation with respect to clients (C2 and C3 in FIG. 13 and C5 in FIG. 14) registered in the VoIP server 1, the client C1 transmits a paging request message to the VoIP server 1 (step S31 in FIG. 13, step S41 in FIG. 14, and step S1 in FIG. 7).

Upon receipt of the paging request message (step F1 in FIG. 7), the VoIP server 1 transmits multicast packets of a test message to the clients C2, C3, and C5 as paging targets (step F2 in FIG. 7, step S32 in FIG. 13, and step S42 in FIG. 14).

The VoIP server 1 waits for responses from the clients C2, C3, and C5 for a predetermined time and then determines whether the responses arrive (step F3 in FIG. 7). In this case, the clients C2 and C3 can receive multicast packets and so transmit response messages (steps S33 and S34 in FIG. 13, YES in step F22 and step F23 in FIG. 9). However, the client C5 cannot transmit a response message because this client cannot receive multicast packets (NO in step F22 in FIG. 9).

Thus, the VoIP server 1 receives response messages from the clients C2 and C3 within a predetermined time, and determines the clients C2 and C3 to be capable of receiving multicast (YES in step F3 in FIG. 7). In contrast, the VoIP server 1 cannot receive any response message from the client C5 within the predetermined time and time-out comes, and then determines the client C5 to be incapable of receiving multicast (step S43 in FIG. 14 and NO in step F3 in FIG. 7).

From the above determination results, the VoIP server 1 requests the client C1 which has requested paging, not to transmit multicast packets but to transmit unicast packets to the client C5 (step S44 in FIG. 14). Therefore, the client C1 transmits paging data in the form of multicast packets to the clients C2 and C3 (step F4 in FIG. 7 and step S35 in FIG. 13), and transmits the paging data in the form of unicast packets to the client C5 (step F5 in FIG. 7 and step S45 in FIG. 14).

As a result of this, the clients C2 and C3 receive, as multicast packets, paging data transmitted from the client C1 while the client C5 receives the above paging data as unicast packets (steps F24 and F25 in FIG. 9).

Thereafter, the client C1 requests the VoIP server 1 to stop paging (step S36 in FIG. 13 and step S46 in FIG. 14).

Thus, according to the present embodiment, the VoIP server 1 automatically determines whether clients each are capable of receiving multicast and prepares a different receiving method from the multicast, for clients incapable of receiving multicast, so that a VoIP system capable of supporting paging and MOH in the form of multicast can be formed.

Particularly in the case of MOH, even if it is unfavorable that every client has plural MOH sound sources due to problems concerning resources, the server may be provided with MOH sound sources and distribute the sources by multicast for every specific group. In this case, the multicast can save the band width more than unicast. This advantage is not limited to audio but appears more conspicuously about contents like videos, i.e., as a wider communication band is consumed. For example, there can be cases of supporting videos in MOH or automatic answering responses.

Second Embodiment

Figure 16:
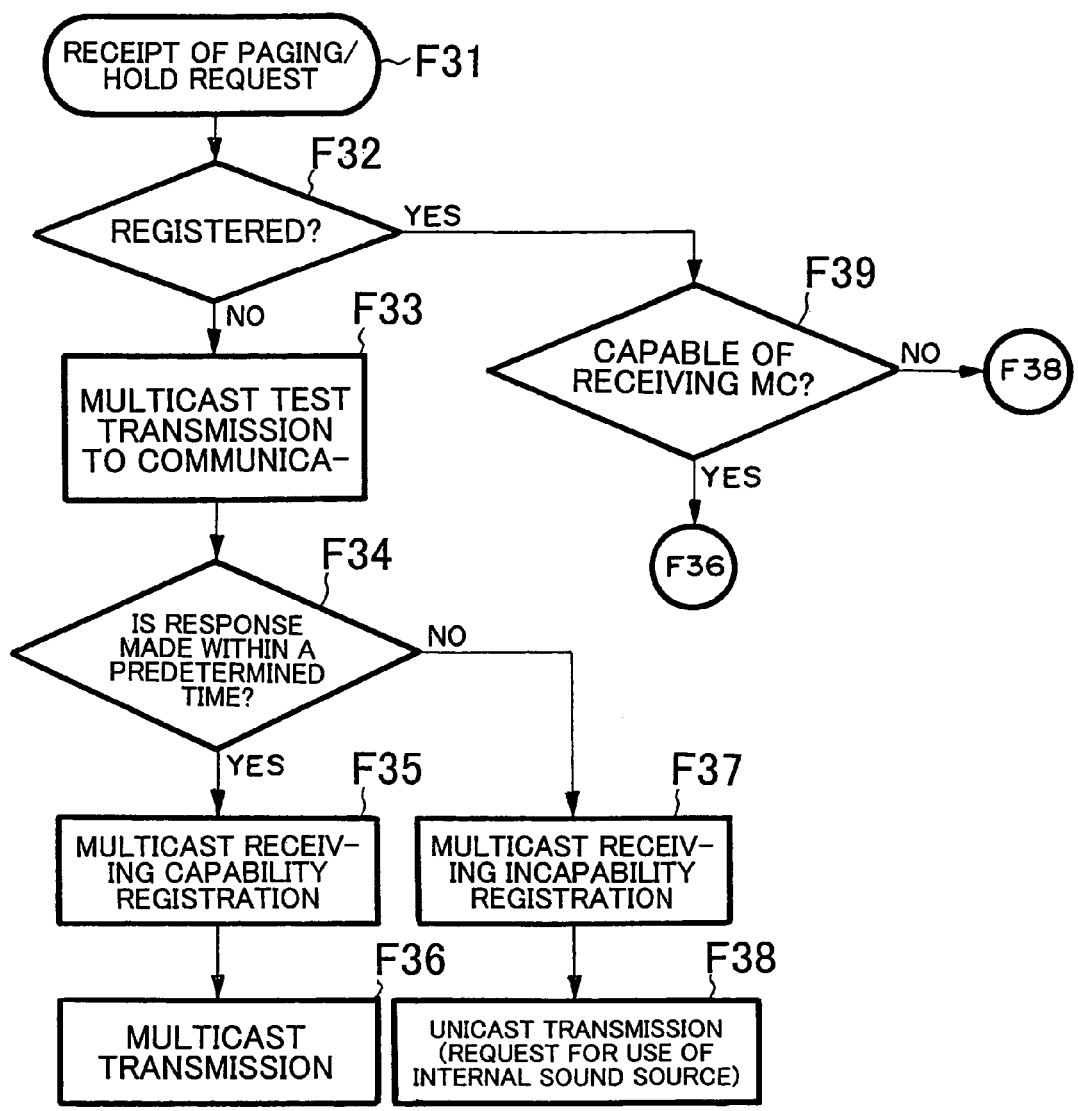
FIG. 16 is a schematic flowchart showing an operation procedure of a VoIP server according to the second embodiment.

The second embodiment of the present invention differs from the foregoing first embodiment (FIG. 7) in inclusion of two further processings, referring to the processings in the side of the VoIP server 1 shown in FIG. 16. One is a processing for registering determination results concerning capability or incapability of receiving multicast packets, in the VoIP server 1 (steps F35 and F37 in FIG. 16). Another is a processing for determining whether the above registration has been made or not (step F32 in FIG. 16). These points are common to the processings in the client's side (see FIGS. 8 and 17).

Operations in case of paging will now be described with reference to FIGS. 16 to 19 in addition to FIGS. 1, 13, and 14 described previously. The clients C1 to C3 and C5 are registered in the VoIP server 1.

As shown in FIGS. 13 and 14, when the client C1 performs a paging operation to clients (C2, C3, and C5 in this case) which are registered in the VoIP server 1, the client C1 transmits a paging request message to the VoIP server 1 (step S31 in FIG. 13 and step S41 in FIG. 14).

When the VoIP server 1 receives the paging request message from the client C1 (step F31 in FIG. 16), the VoIP server 1 makes a search, i.e., whether determination results concerning capabilities of receiving multicast have been registered with respect to the paging targets C2, C3, and C5 (step F32 in FIG. 16). At this time point, no determination results have been registered (NO in step F32), the VoIP server 1 transmits a test message as multicast packets to the clients C2, C3, and C5 as the paging targets (step F33 in FIG. 16, step S32 in FIG. 13, and step S42 in FIG. 14).

The VoIP server 1 waits for responses to the test message from the clients C2, C3, and C5 as paging targets for a predetermined time and determines whether responses are given or not (step F34 in FIG. 16). At this time, the clients C2 and C3 can receive multicast packets and therefore transmit response messages (steps S33 and S34 in FIG. 13, step F61, NO in step F62, YES in step F63, and step F64 in FIG. 17). In contrast, the client C5 cannot receive multicast packets (step F61, NO in steps F62 and F63 in FIG. 17), and then a response from the client C5 cannot be received within the predetermined time and time-out comes (step S43 in FIG. 14). Therefore, the VoIP server 1 determines the client C5 to be incapable of receiving multicast.

Thus, the VoIP server 1 registers the capability of receiving multicast with respect to the clients C2 and C3 (step F35 in FIG. 16), and also registers the incapability of receiving multicast with respect to the client C5 (step F37 in FIG. 16).

Further, the VoIP server 1 requests the client C1 which has requested the paging, to perform unicast transmission to the client C5 (step S44 in FIG. 14). In response, the client C1 transmits paging data to the client C2 and C3 by multicast (step F36 in FIG. 16 and step S35 in FIG. 13) and to the client C5 by unicast (step F38 in FIG. 16 and step S45 in FIG. 14).

Figure 18:
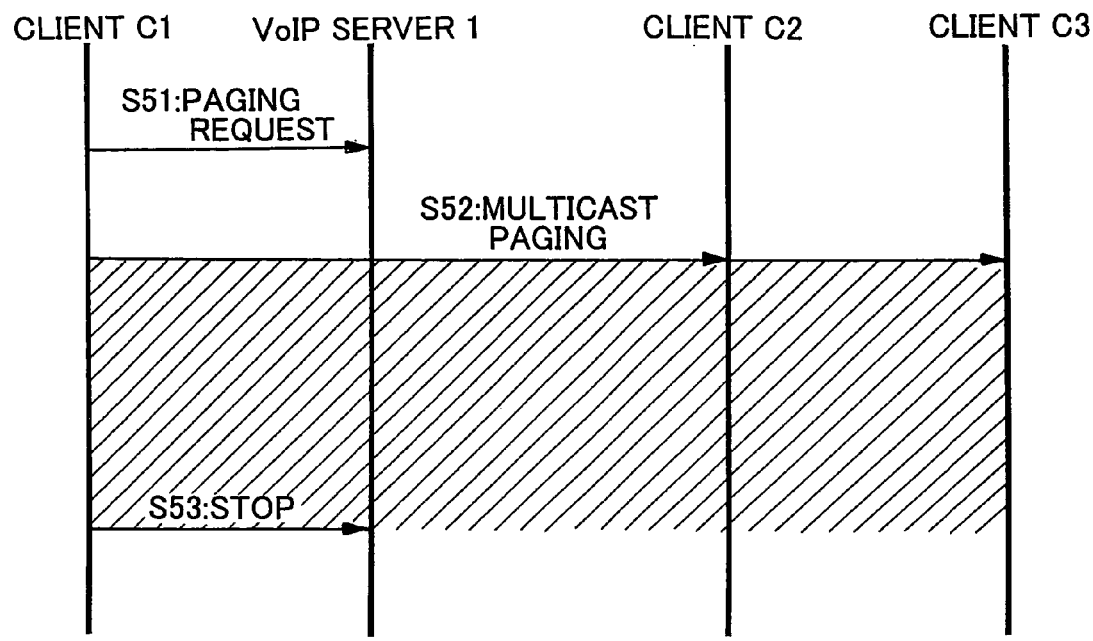
FIG. 18 is a sequence chart in case of transmitting paging data as multicast packets after registration of a multicast test result.
Figure 19:
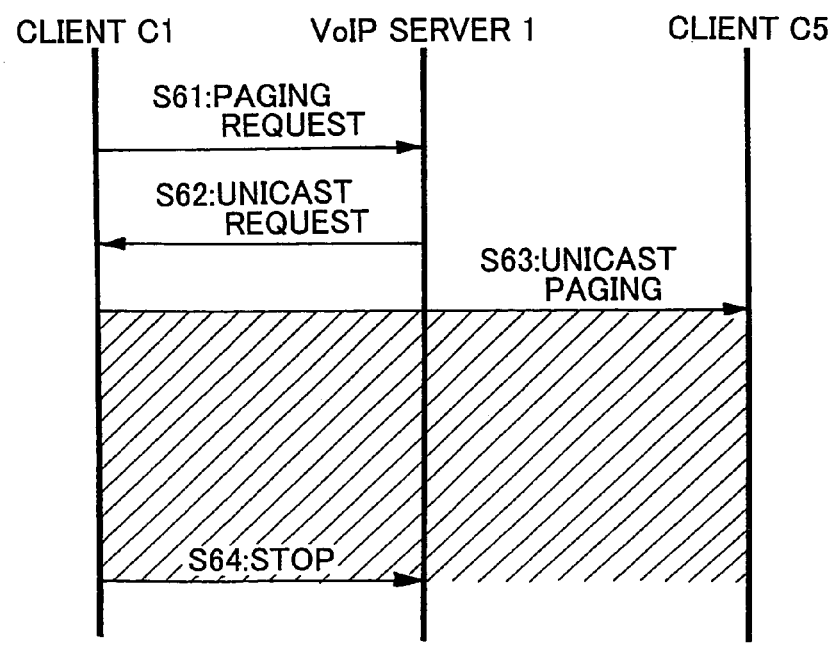
FIG. 19 is a sequence chart in case of transmitting paging data as unicast packets after registration of a multicast test result.

Next, when the client C1 performs a paging operation again on the clients registered in the VoIP server 1, the client C1 transmits a paging request message to the VoIP server 1 (step F31 in FIG. 16, step S51 in FIG. 18, and step S61 in FIG. 19).

The VoIP server 1 makes a search, i.e., whether determination results concerning capabilities of receiving multicast have been registered with respect to the clients C2, C3, and C5 as paging targets (step F32 in FIG. 16). At this time, the determination results with respect to the clients C2, C3, and C5 have already been registered by the processings described above. Therefore, the VoIP server 1 requests the client C1 which has requested the paging, to transmit unicast packets to the client C5 (step S62 in FIG. 19). In this manner, the client C1 transmits paging data as multicast packets to the clients C2 and C3 (step F36 in FIG. 16 and step S52 in FIG. 18) and as unicast packets to the client C5 (step F38 in FIG. 16 and step S63 in FIG. 19).

Figure 17:
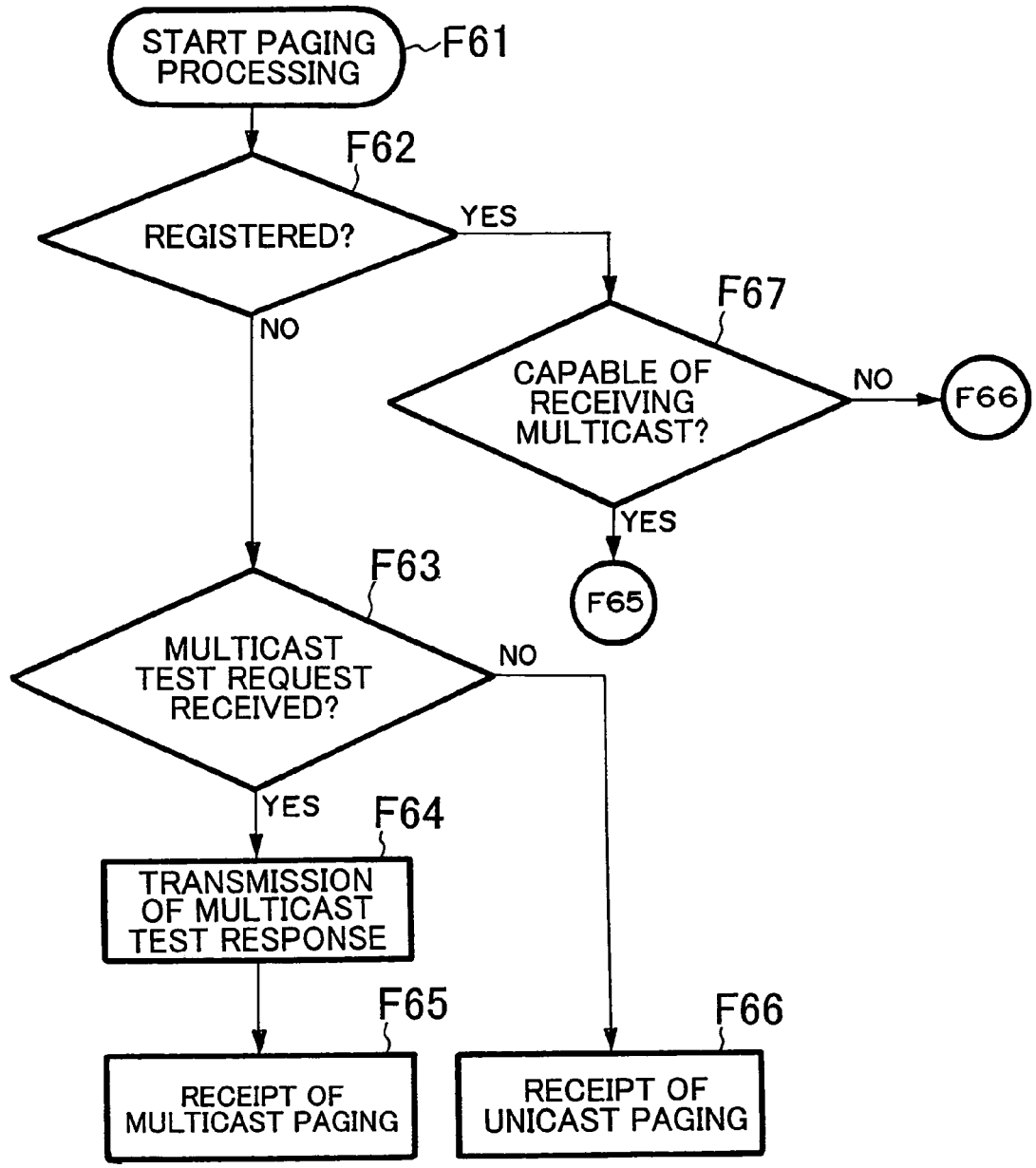
FIG. 17 is a schematic flowchart showing processing operations concerning paging, in the client's side, according to the second embodiment.

As a result, the clients C2 and C3 receive, as multicast packets, paging data transmitted from the client C1 (YES in steps F62 and F67 and step F65 in FIG. 17). In contrast, the client C5 receives the paging data as unicast packets (YES in step F62, NO in step F67, and step F66 in FIG. 17).

Figure 20:
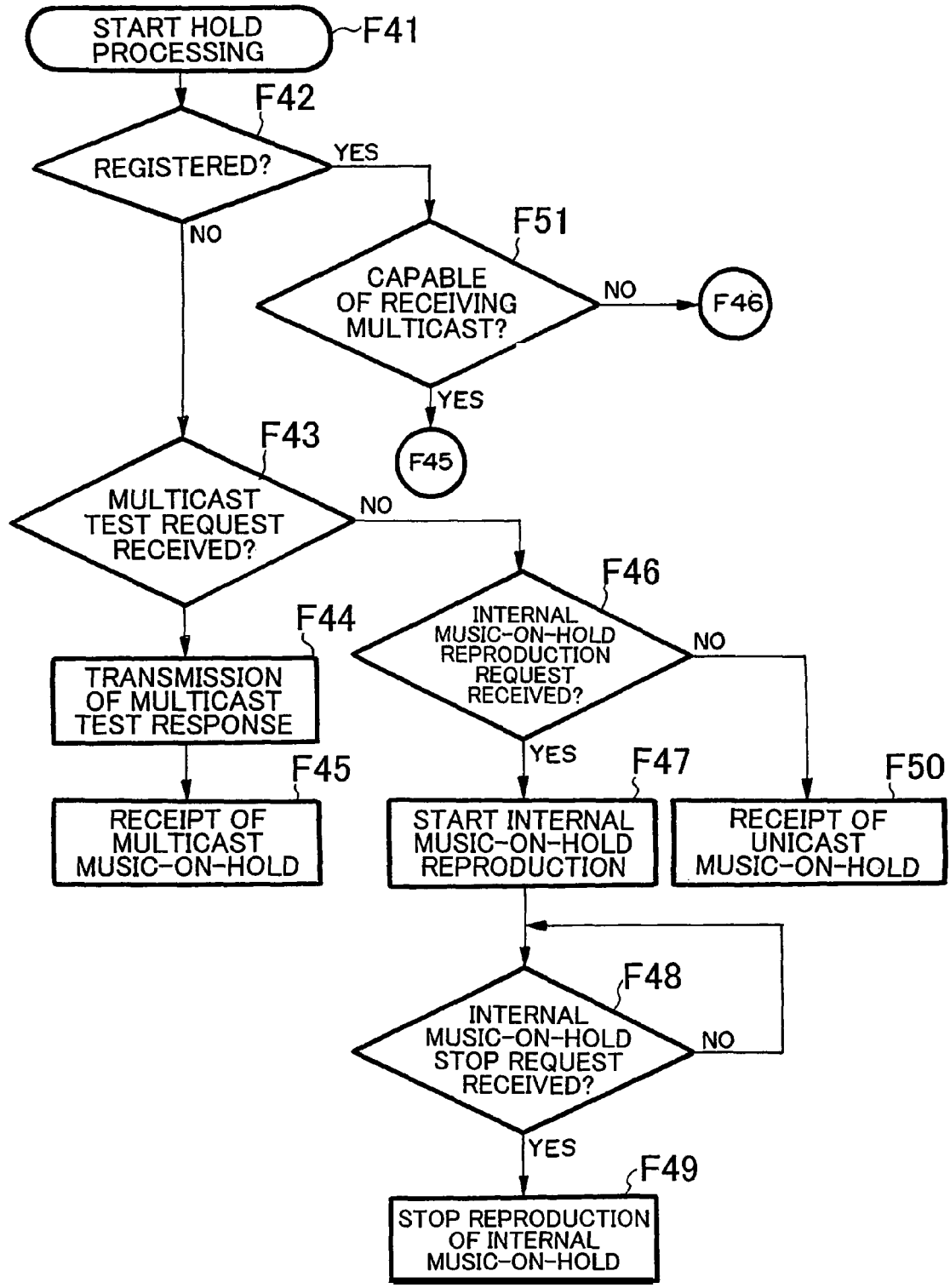
FIG. 20 is a schematic flowchart showing processing operations concerning MOH, in the client's side, according to the second embodiment.

The above description has been made of operations in case of paging. The same description applies to the case of MOH. FIG. 20 shows the processings in the client's side in case of MOH (see steps F41 to F51). These processings in the client's side are nearly the same as the foregoing processings shown in FIG. 8 except that a processing (steps F62 and F67 in FIG. 17) is added to the client's side. The processing added to the client's side corresponds to the processing in which determination results concerning capabilities or incapabilities of receiving multicast packets are registered in the VoIP server 1, and determinations are made on whether the registrations have been made.

Thus, this second embodiment is further applicable even during an holding operation, and can avoid making determinations for every holding operation, by making use of registration information concerning capability or incapability of receiving multicast, in addition to the same advantages as those of the foregoing embodiment. Registrations of determination results can be used continuously until the same clients are registered again in the VoIP server 1. Alternatively, the determination results may be used continuously until the IP addresses of clients are changed.

In the present embodiment, previous determination results have been registered with respect to those clients that have once been determined to be capable or incapable of receiving multicast. Hence, a new advantage is achieved in that those clients can be supported with MOH and paging without making tests again.

The above embodiments have been described in case of transmitting paging data and MOH data as the multicast packets. However, the present invention is not limited hitherto but is applicable to communications among three or more parties (telephone-communication conferences [conference call]) and streaming.

Also, the above embodiments have been described about processings in both cases where clients have internal sound sources and where not. This is based on a prerequisite that clients have or do not have internal sound sources in the entire VoIP system. In contrast, in case where clients having internal sound sources and clients having none are mixed in the VoIP system, the VoIP server 1 may be informed of presence or absence of an MOH internal sound source as additional information whenever a client is registered in the VoIP server 1. Then, the VoIP server 1 can register the additional information in a registration table and can determine whether a target client has an internal sound source or not, based on the registration table, when the VoIP server 1 receives a hold request message from a client.

Note that the present invention is not limited to the embodiments typically exemplified above but persons skilled in the art would obviously be able to modify and change the present invention into various practical forms, based on the contents of the claims, without deviating from the subject matters of the invention. Such modifications and changes would be considered as being within the scope of the present invention.

As has been described, according to the present invention, it is possible to provide a VoIP system, a VoIP server, a client, and a multicast packet communication method, which are capable of supporting clients incapable of receiving multicast packets, to be able to receive transmitted data even when transmission data of paging or MOH is transmitted as multicast packets with use of the VoIP system.

What is claimed is:

1. A Voice over Internet Protocol (VoIP) system in which voice communication is performed between a source client for transmitting Internet Protocol (IP) packets and a destination client for receiving the IP packets via an IP network, comprising:
    a VoIP server connected to the IP network; and
    a plurality of clients including the source client and the destination client, and being connected communicably to the VoIP server via the IP network, wherein
    each of the clients comprises
    a first multicast transmission unit configured to transmit predetermined transmission data, as multicast packets addressed at a specific multicast address, to destination clients via the IP network, and
    a multicast transmission request unit configured to send a predetermined request message to the VoIP server so as to request the VoIP server to transmit the multicast packets, and
    the VoIP server comprises
    a second multicast transmission unit configured to transmit the multicast packets to the destination clients, upon receipt of the request message sent from the clients by the multicast transmission request unit.

2. The VoIP system according to claim 1, wherein the VoIP server further comprises:
    a determination unit configured to determine whether the destination clients are capable of receiving the multicast packets when the multicast packets are transmitted by the first or second multicast transmission unit; and
    a transmission control unit configured to control the first or second multicast transmission unit to transmit the transmission data as unicast packets to the destination clients which are determined to be incapable of receiving the multicast packets, based on a determination result.

3. The VoIP system according to claim 2, wherein the determination unit transmits a predetermined test message as multicast packets to the destination clients and determines whether the destination clients can receive the multicast packets or not.

4. The VoIP system according to claim 2, wherein the transmission control unit comprises
    a table in which determination results obtained by the determination unit are registered, and
    a unit which makes the transmission control unit operate based on the determination results registered in the table, without using the determination unit.

5. The VoIP system according to claim 1, wherein the transmission data is data broadcasted concurrently by paging.

6. The VoIP system according to claim 1, wherein the transmission data is music-on-hold data to be sent in accordance with a hold operation at the time of the voice communication.

7. The VoIP system according to claim 6, wherein
    the VoIP server further comprises a unit which sends a request for reproducing an internal sound source, to the destination clients, if the destination clients each have the internal sound source of the music-on-hold data, and
    each of the clients further comprises a unit which reproduces the internal sound source upon receipt of the reproduction request.

8. A Voice over Internet Protocol (VoIP) server for use in a VoIP system in which voice communication is performed between a source client for transmitting Internet Protocol (IP) packets and a destination client for receiving the IP packets via an IP network, comprising:

a multicast transmission unit which transmits predetermined data as multicast packets to destination clients, upon receipt of a request message requesting transmission of multicast packets and sent from the source client;

a determination unit which determines whether the destination clients are capable of receiving the multicast packets when the multicast packets are transmitted by the multicast transmission unit or the source client; and a transmission control unit which controls the multicast transmission unit or the source client to transmit the transmission data as unicast packets to those destination clients which are determined to be incapable of receiving the multicast packets, based on a determination result.

9. The VoIP server according to claim 8, wherein the determination unit transmits a predetermined test message as multicast packets to the destination clients and determines whether the destination clients can receive the multicast packets or not.

10. The VoIP server according to claim 8, wherein the transmission control unit comprises a table in which determination results obtained by the determination unit are registered, and a unit which makes the transmission control unit operate based on the determination results registered in the table, without using the determination unit.

11. The VoIP server according to claim 8, wherein the transmission data is music-on-hold data to be sent in accordance with a hold operation at the time of the voice communication, and the VoIP server further comprises a unit which sends a request for reproducing the internal sound source, to the destination clients, if the destination clients each have an internal sound source of the music-on-hold data.

12. A client connected communicably to a Voice over Internet Protocol (VoIP) server via an Internet Protocol (IP) network, comprising:

a unit which transmits predetermined transmission data, as multicast packets addressed at a specific multicast address, to destination clients; and a unit which transmits a predetermine request message, requesting the VoIP server to transmit the multicast packets, to the VoIP server, wherein the transmission data is music-on-hold data to be sent in accordance with a hold operation at the time of a voice communication, and the destination clients comprise:

an internal sound source of the music-on-hold data; and a unit which reproduces the internal sound source, upon receipt of a reproduction request requesting reproduction of the internal sound source from the VoIP server.

13. A multicast packet communication method for a Voice over Internet Protocol (VoIP) system comprising a VoIP server connected to an Internet Protocol (IP) network, and a plurality of clients connected communicably to the VoIP server via the IP network, enabling voice communication via the IP network between a source client among the plurality of clients, which transmits IP packets, and a destination client among the plurality of clients, which receives the IP packets, the method comprising:

a step in which any one of the plurality of clients transmit predetermined transmission data, as multicast packets addressed at a specific multicast address, to destination clients;

a step in which a predetermined request message is sent from any one of the plurality of clients to the VoIP server, to request the VoIP server to transmit the multicast packets;

a step in which upon receipt of the request message sent from any one of the plurality of clients, the VoIP server transmits the multicast packets to the destination clients;

a step in which when the multicast packets are transmitted by the VoIP server or any one of the plurality of clients, whether the destination clients can receive the multicast packets or not is determined; and a step in which the VoIP server performs control to transmit the transmission data as unicast packets to the destination clients that are determined to be incapable of receiving the multicast packets, based on the determination results.

14. The multicast packet communication method according to claim 13, wherein the transmission data is music-on-hold data to be sent in accordance with a hold operation at the time of the voice communication, and the method further comprises:

a step in which if the destination clients have an internal sound source of the music-on-hold data, the VoIP server sends a reproduction request requesting reproduction of the internal sound sources to the destination clients; and a step in which upon receipt of the reproduction request, the destination clients reproduce the internal sound source.

* * * * *